United States Patent [19]

Wade

[11] 4,096,031
[45] Jun. 20, 1978

[54] NUCLEAR REACTOR REFUELING SYSTEM

[75] Inventor: Elman E. Wade, South Huntingdon Township, Huntingdon County, Pa.

[73] Assignee: Westinghouse Electric Corp., Pittsburgh, Pa.

[21] Appl. No.: 707,594

[22] Filed: Jul. 22, 1976

[51] Int. Cl.² ............... G21C 19/22; G21C 19/20; B66C 17/08
[52] U.S. Cl. ..................... 176/32; 176/30; 214/18 N
[58] Field of Search ............. 176/30, 31, 32, 87; 214/17 R, 17 A, 18 N, 103

[56] References Cited

U.S. PATENT DOCUMENTS

| B 373,344 | 2/1976 | Katz | 176/30 |
|---|---|---|---|
| 3,058,900 | 10/1962 | Frisch | 176/30 |
| 3,354,040 | 11/1967 | Frame | 176/30 |
| 3,637,096 | 12/1972 | Crate | 176/30 |
| 3,733,250 | 5/1973 | Van Santen | 176/30 |
| 3,773,616 | 11/1973 | Aubert | 176/30 |
| 3,904,048 | 9/1975 | Van Santen | 176/30 |
| 3,909,350 | 9/1975 | Dupuy | 176/30 |
| 3,915,792 | 10/1975 | Aubert | 176/30 |
| 3,952,885 | 4/1976 | Schabert | 176/30 |

Primary Examiner—Verlin R. Pendegrass
Assistant Examiner—Donald P. Walsh
Attorney, Agent, or Firm—L. A. DePaul; Z. L. Dermer

[57] ABSTRACT

A system for transferring fuel assemblies between a nuclear reactor core and a fuel storage area while the fuel assemblies remain completely submerged in a continuous body of coolant. The system comprises an in-vessel fuel transfer machine located inside the reactor vessel and an ex-vessel fuel transfer machine located in a fuel storage tank. The in-vessel fuel transfer machine comprises two independently rotatable frames with a pivotable fuel transfer apparatus disposed on the lower rotatable frame. The ex-vessel fuel transfer machine comprises one frame with a pivotable fuel transfer apparatus disposed thereon. The pivotable apparatuses are capable of being aligned with each other to transfer a fuel assembly between the reactor vessel and fuel storage tank while the fuel assembly remains completely submerged in a continuous body of coolant.

9 Claims, 7 Drawing Figures

NUCLEAR REACTOR REFUELING SYSTEM

CROSS-REFERENCE TO RELATED APPLICATIONS

The invention herein disclosed is related to copending applications Ser. No. 660,744, filed Feb. 23, 1976, entitled "Nuclear Reactor Fuel Transfer System;" and Ser. No. 660,746, filed Feb. 23, 1976, entitled "Ex-vessel Nuclear Fuel Transfer System", both filed in the name of E. E. Wade and both assigned to the assignee of the present invention.

BACKGROUND OF THE INVENTION

This invention relates to refueling systems for a nuclear reactor and more particularly to a system for transferring fuel assemblies between a reactor core and a fuel storage area while the fuel assemblies remain completely submerged in a continuous body of coolant.

In nuclear reactors, particularly sodium cooled fast breeder reactors, a reactor vessel having an inlet and an outlet for the circulation therethrough of a coolant has a closure head disposed thereon in a fluid tight relationship. A core comprising fuel assemblies is supported within the reactor vessel. The fuel assemblies comprise a plurality of fuel rods that contain nuclear fuel. Under appropriate conditions, the fuel rods generate heat in a manner well known in the art. The coolant circulating through the reactor vessel passes in a heat transfer relationship with the fuel assemblies thereby cooling the fuel rods while carrying the heat away to generate electricity in a commonly known fashion. After a period of operation, the nuclear fuel in the fuel rods becomes depleted necessitating the replacement of the fuel assemblies with fresh ones; a process generally known as refueling of the reactor. While being replaced, decay heat is generated by the fuel rods of the fuel assembly.

During the refueling of sodium cooled fast breeder reactors, it is necessary to remove the decay heat from the irradiated fuel assemblies to prevent their reaching a temperature at which the fuel rod ruptures, because the rupture of the fuel rod results in the release of radioactive gases thus presenting health and contamination problems that are unacceptable. Therefore, it has become accepted practice to provide a means of dissipating the decay heat of an irradiated assembly by providing a system whereby the fuel assembly is kept submerged in a sodium coolant during transfer between the reactor and decay storage.

In most under sodium refueling systems, the means of keeping the fuel assembly submerged in sodium has been to place the fuel assembly in a sodium filled pot, a container with an open end, and then transfer the pot to the desired location. With this type of under sodium refueling system, an auxiliary gas or liquid metal cooling system for the pot of sodium is always necessary to meet an emergency condition such as failure of the transfer means. In addition, the ever present possibility of failure of the auxiliary system must be dealt with by providing a backup system. Typically, the cooling capability of the gas system is limited to about (10) KW because of technology limitations. In large commercial fast breeder reactor plants the decay heat from a spent fuel assembly, at the time after reactor shutdown when it is economical to do refueling, is as much as (60) KW or greater. An auxiliary cooling system capable of safely removing that amount of heat, is not presently compatible with the entire reactor plant economics and technology.

In the British Prototype Fast Reactor (PFR) refueling system, the irradiated fuel assembly is stored in a rotor inside the reactor vessel for an initial decay period, and then moved through an opening in the reactor head into a transfer machine located outside of the reactor vessel, an ex-vessel transfer machine. The machine moves above an opening in a transfer tunnel, couples onto a mechanism around the opening, and lowers the fuel assembly through the opening. Equipment within the tunnel moves the fuel assembly laterally in the tunnel to beneath a second opening in the top of the tunnel. A crane mounted machine moves the fuel assembly through a valve on the opening into a fuel handling cell and into further storage prior to partial disassembly for shipping to reprocessing. Aside from the cost problems, there are problems associated with sophisticated interlocks that must be provided to insure against release of fission products during refueling because of the danger to operating personnel. In addition, the valves and adapters associated with coupling the ex-vessel transfer machine to the mechanism around the opening in the reactor head and to the mechanism around the opening in the tunnel are large and expensive. This coupling and uncoupling process is also quite time consuming which increases the refueling time.

The British Commercial Fast Reactor (CFR) refueling system stores the irradiated fuel assembly in a rotor inside the reactor vessel for an initial decay period, then moves it through an opening in the reactor head to a gas cooled compartment and then through an opening in the compartment into a sodium filled compartment outside of containment. The closures in the openings of the compartments are expensive to install and maintain.

The French Phenix and Phenix 4 refueling systems move the irradiated fuel assembly in a pot through an opening in the reactor head into a gas cooled compartment, then through an opening in the compartment into a decay storage rotor outside of the containment housing the reactor. After a decay period the fuel assembly is moved from the rotor through an opening into a fuel handling cell. In this concept a major safety problem would result if the cooling system of the gas cooled compartment fails and the sodium filled pot containing the fuel assembly becomes stuck in the compartment, as would happen in a power failure. This would result in the fuel assembly overheating and possibly rupturing the fuel rods releasing contaminants.

The Russian liquid metal power reactor refueling systems, in principle, handle the fuel assemblies similarly to the French and British, and are subject to similar problems.

In U.S. Pat. No. 3,915,792, to M. Aubert et al, issued Oct. 28, 1975, there is described a hood for transferring fuel assemblies between two separate areas in a flask filled with a coolant while attempting to maintain a barrier against contamination of the atmosphere. Because the Aubert patent describes the transfer of a fuel assembly from the reactor coolant body into a flask filled with coolant and then lifts the flask above the reactor coolant body, the fuel assembly is not transferred under a continuous body of coolant. Under these circumstances the Aubert patent does not solve the problem of the flask becoming immobilized above the reactor coolant body thereby possibly overheating.

In copending application Ser. No. 660,744, filed Feb. 23, 1976, entitled "Nuclear Reactor Fuel Transfer System", by E. E. Wade, which is assigned to the present assignee, there is described a system capable of transferring fuel assemblies between a nuclear reactor core and a fuel transfer area while the fuel assemblies remain completely submerged in a continuous body of coolant. However, that system employs a device for lifting fuel assemblies which is disposed at an angle on a tilted rotatable plug of the closure head. While the invention described in copending application Ser. No. 660,744 is an acceptable alternative, design considerations may proscribe the use of a tilted rotatable plug while suggesting the use of a substitute such as a pivotable apparatus.

Another system for refueling a nuclear reactor while the fuel assemblies remain completely submerged in a continuous body of coolant is described in copending application Ser. No. 660,746, filed Feb. 23, 1976, entitled "Ex-vessel Nuclear Fuel Transfer System", by E. E. Wade, and assigned to the present assignee. That system describes the use of a pivotable apparatus associated with rotatable closure head plugs but that system does not utilize a fuel assembly as the link activating the pivoting mechanism.

U.S. Pat. No. 3,909,350, to G. Dupuy, issued Sept. 30, 1975, describes a handling device comprising two tubular arms having synchronized movements for loading and unloading fuel assemblies within a nuclear reactor. In the Dupuy patent it is the entire upper arm that provides the vertical movement for lifting or lowering the chosen fuel assembly. In addition, the Dupuy patent does not teach a method of refueling the reactor while the fuel assemblies remain completely submerged in a continuous body of coolant.

SUMMARY OF THE INVENTION

The system comprises an in-vessel fuel transfer machine located inside the reactor vessel and an ex-vessel fuel transfer machine located in a fuel storage tank disposed outside the reactor vessel. The in-vessel fuel transfer machine comprises an upper and a lower independently rotatable frames with a pivotable fuel transfer apparatus disposed on the lower frame. The two frames and pivotable apparatus are capable of being positioned over a chosen fuel assembly of the core so that a grappling device associated with the upper frame may lift a fuel assembly into the pivotable apparatus. The ex-vessel fuel transfer machine comprises a pivotable fuel transfer apparatus disposed on a rotatable frame. The rotatable frames together with the pivoting action of the pivotable fuel transfer apparatuses are capable of aligning the pivotable apparatuses in order to transfer a fuel assembly between the reactor vessel and fuel storage tank while the fuel assembly remains completely submerged in a continuous body of coolant.

It is an object of this invention to provide a device employing rotatable frames and a pivotable apparatus associated therewith for transferring a fuel assembly between a reactor core and a fuel storage area while the fuel assembly remains completely submerged in a continuous body of coolant.

It is another object of this invention to provide a device employing a single rotatable frame and a pivotable apparatus disposed thereon for transferring a fuel assembly between a fuel storage area and a reactor vessel while the fuel assembly remains completely submerged in a continuous body of coolant.

It is a particular object of this invention to provide devices employing rotatable frame and pivotable apparatuses associated with a rotatable frame for transferring a fuel assembly between a reactor core and a fuel storage area while the fuel assembly remains completely submerged in a continuous body of coolant.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

A typical nuclear reactor consists of a reactor vessel with a closure head disposed thereon in a fluid tight manner. Disposed within the reactor vessel is a core containing fuel assemblies. The fuel assemblies usually comprise a bundle of cylindrical fuel rods containing nuclear fuel. When arranged appropriately, the fuel rods generate heat in a manner well known in the art. In addition, the reactor vessel has an inlet and an outlet for circulating a coolant in a heat transfer relationship with the fuel assemblies. The coolant, which is a fast breeder reactor may be liquid sodium, absorbs the heat generated by the fuel rods and carries the heat away to generate electricity in the usual manner. After a period of operation, the nuclear fuel in the fuel rods becomes depleted necessitating the replacement of the fuel assemblies containing the spent fuel rods with fresh fuel assemblies, a process generally known as refueling of the reactor. While the spent fuel assemblies are being replaced, the spent fuel assemblies continue to generate heat which is referred to as decay heat. Because the decay heat may cause a failure of the fuel rod releasing radioactive particles, it is necessary to provide a continuous cooling mechanism for the fuel assemblies in transit. The invention, herein disclosed, provides a system for cooling these fuel assemblies while in transit.

Figure 1:
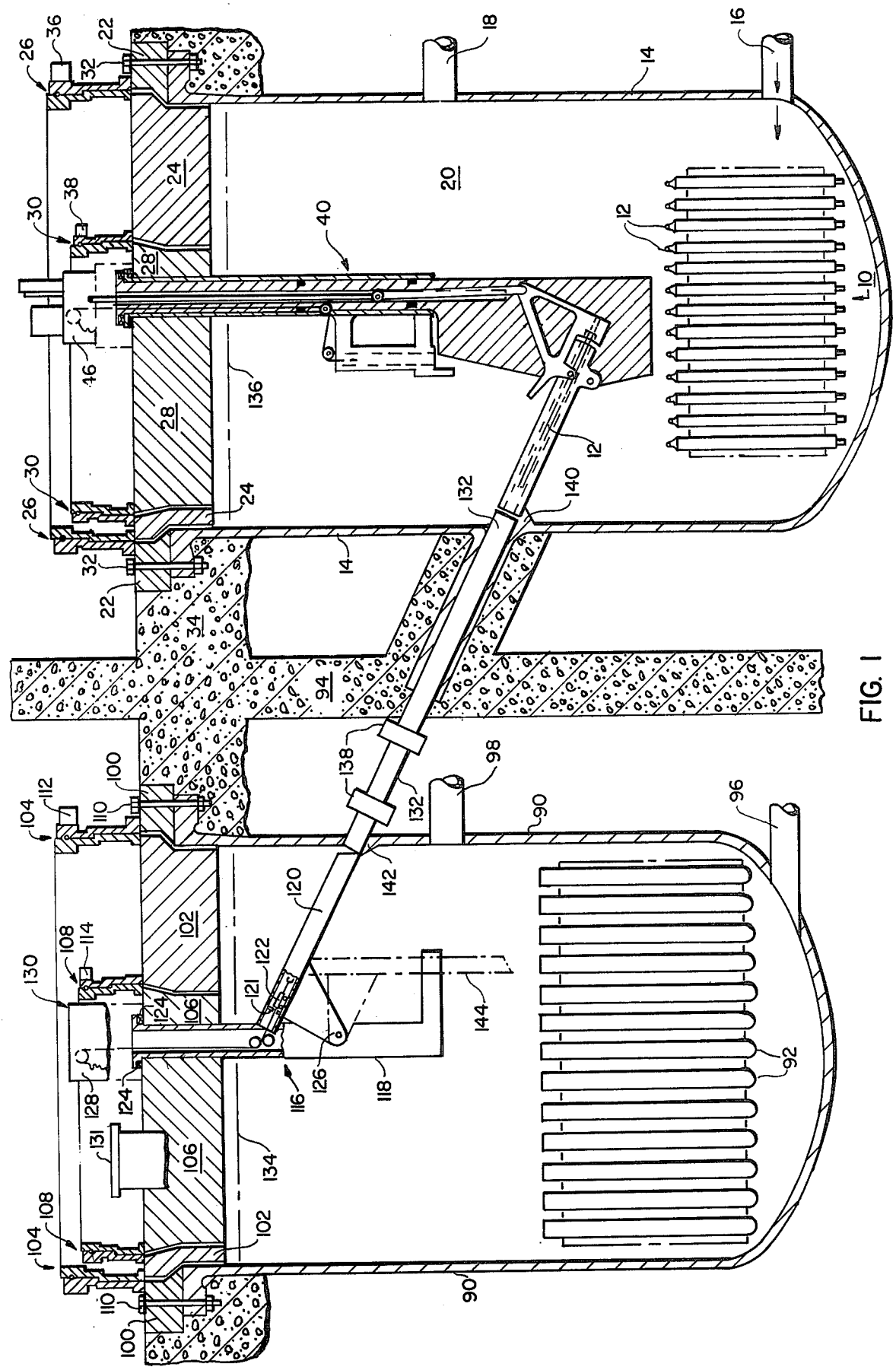
FIG. 1 is a cross-sectional view in elevation of the transfer system.

Referring to FIG. 1, a core 10 containing fuel assemblies 12 which generate heat in a manner well known in the art is disposed within a reactor vessel 14 which serves to isolate the core 10 from the environment external to reactor vessel 14. Reactor vessel 14 has an inlet 16 and an outlet 18 for the circulation of a coolant 20 which in a fast breeder reactor may be liquid sodium. Coolant 20 circulates through core 10 in a heat transfer relationship with fuel assemblies 12 thereby carrying the heat generated by the core 10 to a system (not shown) for generating electricity in a conventional manner.

A closure head comprising a stationary outer ring 22, a large rotatable plug 24, a large riser assembly 26, a small rotatable plug 28, and a small riser assembly 30 is attached to reactor vessel 14 in a fluid tight manner by suitable means such as bolts 32. The entire reactor vessel may be supported in a concrete containment structure 34. The large rotatable plug 24 is supported from the stationary outer ring 22 by larger riser assembly 26. The outer edge of large rotatable plug 24 together with the inner edge of stationary outer ring 22 define an annulus between them. Large riser assembly 26 which contains bearings and seals (not shown) together with large rotatable plug drive mechanism 36 enables large rotatable plug 24 to rotate relative to stationary outer ring 22 while maintaining a fluid tight boundary between the outside and inside of reactor vessel 14. In addition, the large riser assembly 26 locates the bearing, seals, and drive mechanism away from the hot surface of large rotatable plug 24 thus providing a cooler operating environment and thus allowing a greater range of selectivity of bearing, seal, and drive mechanism materials. The particular selection and arrangement of the bearings, seals, and drive mechanism may be one of many well known in the art.

Small rotatable plug 28 having small riser assembly 30 is disposed eccentrically within large rotatable plug 24. The small riser assembly 30, which contains bearings and seals (not shown) and small rotatable plug drive mechanism 38 enables small rotatable plug 28 to rotate relative to large rotatable plug 24 in a manner similar to that of large riser assembly 26.

Disposed on the small rotatable plug 28 is the in-vessel transfer machine indicated generally by 40. In-vessel transfer machine 40 is capable of extracting a chosen fuel assembly 12 from the core 10 and placing the chosen fuel assembly 12 in a position to be removed from the reactor vessel 14. Of course, the in-vessel transfer machine also is capable of placing a fresh fuel assembly in the core 10.

Figure 2:
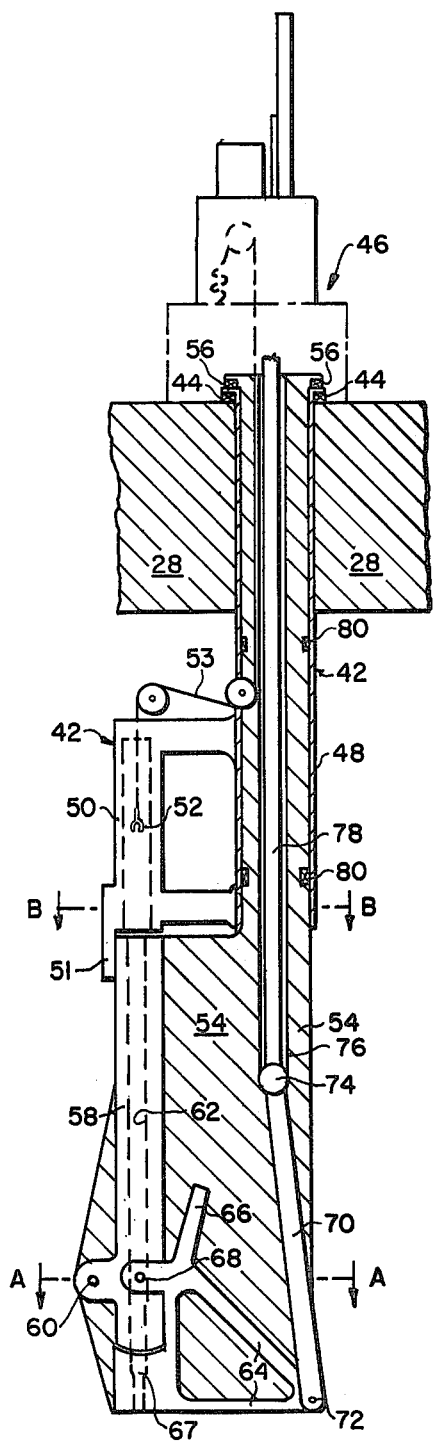
FIG. 2 is a cross-sectional view in elevation of the in-vessel transfer machine.

FIG. 2 illustrates the in-vessel transfer machine 40 in more detail. The in-vessel transfer machine 40 consists of two independently rotatable frames. The upper frame 42 is supported from the small rotatable plug 28 in a conventional manner by bearings and seals 44. Upper frame drive mechanism (not shown) enclosed in housing 46 together with bearings and seals 44 enable upper frame 42 to rotate relative to small rotatable plug 28. Upper frame 42 comprises a hollow cylindrical member 48, grapple housing 50 having a lip 51, and grapple 52. Cylindrical member 48 extends from the top of small rotatable plug 28 to a point in the pool of coolant 20. Grapple housing 50 is attached to cylindrical member 48. Grapple 52 which may be chosen from those well known in the art is disposed in grapple housing 50 while the grapple chain 53 extends by means of rollers from grapple 52, to grapple actuating mechanism (not shown) which is located in housing 46. The grapple actuating mechanism may be chosen from those well known in the art such as a chain and sprocket arrangement. The lower frame 54 of the in-vessel transfer machine 40 is supported by bearings and seals 56 and driven by a drive mechanism (not shown) enclosed in housing 46 such that the upper frame 42 and lower frame 54 may rotate relative and independently of each other. Lower frame 54 extends from bearings and seals 56 through cylindrical member 48 to below grapple housing 50. A pivotable apparatus 58 is mounted on lower frame 54 by means of pin arrangement 60. Pivotable apparatus 58, a tubular member having a bore 62 therein for holding a fuel assembly, is capable of pivoting in the vertical plane about pin arrangement 60. A first link 64 having a stop 66 thereon and a socket 67 therein is disposed on pivotable apparatus on and a socket 67 therein is disposed on pivotable apparatus 58 by a dual pin arrangement 68 which allows first link 64 to pivot in the vertical plane about the axis of dual pin arrangement 68 without actuating pivotable apparatus 58. A second link 70 is pinned to first link 64 by pin 72. Second link 70 is attached to roller guide 74 which is disposed in roller guide tube 76 and attached to third link 78. Roller guide tube 76 is mounted in the lower frame 54 in a vertical alignment to insure vertical movement of roller guide 74. The third link 78 is attached to a linkage actuator (not shown) which is enclosed in housing 46 and may be chosen from those linkage actuators well known in the art. In addition, the lower and upper frames may be spaced from each other along their length to facilitate their rotation by bearings noted generally as 80.

Referring again to FIG. 1, a storage vessel 90 having storage racks 92 supported therein is disposed adjacent to reactor vessel 14 but separated therefrom by containment wall 94. Storage vessel 90 has an inlet 96 and an outlet 98 for the circulation of a coolant (which may be the same as coolant 20) in heat transfer relationship with storage racks 92 which may contain spent fuel assemblies so as to absorb decay heat that may be present. A closure head comprising outer ring 100, first rotatable plug 102, first riser assembly 104, second rotatable plug 106, and second riser assembly 108 is disposed on storage vessel 90 in a fluid tight manner similar to the closure head of reactor vessel 14. Outer ring 100 may be attached to storage vessel 90 by suitable means such as bolts 110. A first rotatable plug drive mechanism 112 is disposed on first riser assembly 104 which enables first rotatable plug 102 to rotate relative to outer ring 100. Likewise, second plug drive mechanism 114 provides the rotational drive means for second rotatable plug 106. The configuration and operation of the closure head of the storage vessel 90 may be similar to that of the closure head of reactor vessel 14; however, it is recognized that other suitable arrangements of the closure head based on these principles will occur to those skilled in the art. The in-vessel transfer machine referred to generally by 116 is disposed on second rotatable plug 106. In-vessel transfer machine 116 which is capable of transferring fuel assemblies between storage racks 92 and in-vessel transfer machine 40 comprises support assembly 118, fuel assembly carriage 120 having stop 121 therein, and grapple mechanism 122. Support assembly 118 extends from the top of second rotatable plug 106 down to a point in the coolant and is supported on second rotatable plug 106 by bearings and seals 124 which may be chosen from those well known in the art. Bearings and seals 124 provide a means by which support assembly 118 under the action of an appropriate drive means (not shown) may rotate with respect to second rotatable plug 106. The fuel assembly carriage 120 is supported on support assembly 118 by a pivoting assembly 126 which enables fuel assembly carriage 120 to pivot in a vertical plane with respect to support assembly 118. Grapple mechanism 122 contained within fuel assembly carriage 120 and under the control of a grapple control mechanism 128, which is contained in control housing 130 and may be chosen from those well known in the art, is capable of lifting a chosen fuel assembly into or lower a chosen fuel assembly out of fuel assembly carriage 120. In addition, an exit port 131 may be provided on the second rotatable plug 106 so that fuel assemblies may be introduced to or removed from the storage vessel 90.

The storage vessel 90 communicates with reactor vessel 14 by means of an exit side tube 132 which extends from a wall of the storage vessel 90 through containment wall 94 into reactor vessel 14. Since the exit side tube 132 is completely below storage vessel coolant level 134 and reactor vessel coolant level 136, the exit side tube 132 allows the coolants of reactor vessel 14 and storage vessel 90 to be a continuous body of coolant. However, valves 138, which may be chosen from those known in the art such as gate valves, are located in exit side tube 132 to provide the capability of isolating the reactor vessel 14 from the storage vessel 90.

OPERATION

Refueling of the core 10 may be accomplished by extracting a fuel assembly 12 from the core 10 by using the in-vessel transfer machine 40. The ex-vessel transfer machine would then transfer the fuel assembly from the in-vessel transfer machine 40 to a storage rack 90. An appropriate mechanism which may be chosen from those well known in the art may then be inserted in exit port 131 to be used to extract the spent fuel assembly from storage rack 90. Of course, the reverse of this process may be utilized to insert a fresh fuel assembly into the core 10.

Figure 3:
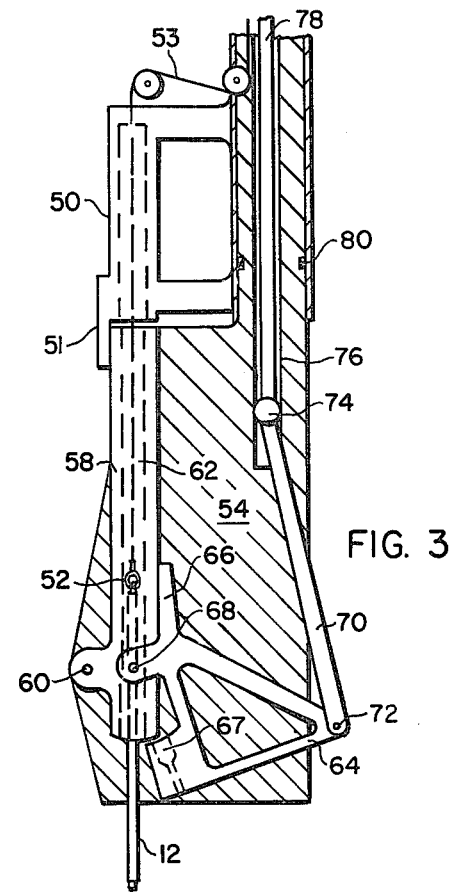
FIG. 3 is a cross-sectional view in elevation of the in-vessel transfer machine with a fuel assembly partially raised into it.
Figure 4:
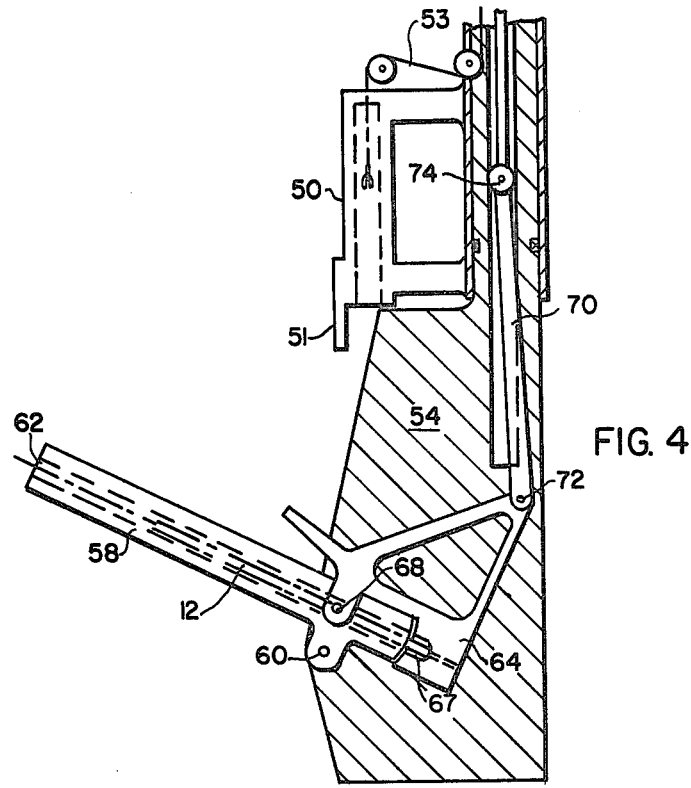
FIG. 4 is a cross-sectional view in elevation of the in-vessel transfer machine in position to have the fuel assembly removed by the ex-vessel transfer machine.
Figure 5:
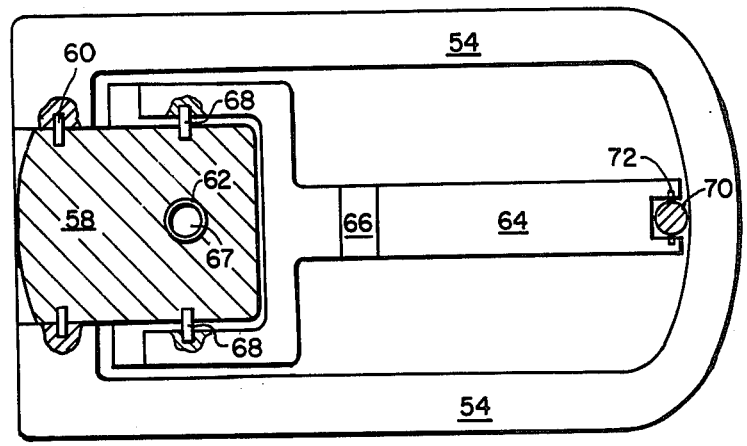
FIG. 5 is a cross-sectional view of the in-vessel transfer machine through A—A of FIG. 2.
Figure 6:
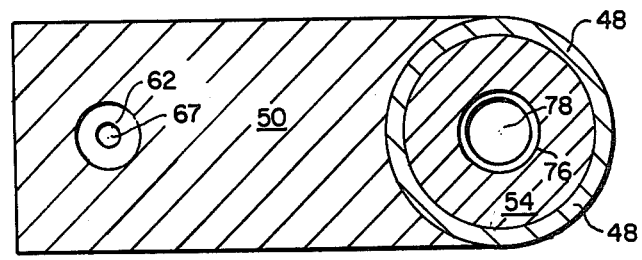
FIG. 6 is a cross-sectional view of the in-vessel transfer machine through B—B of FIG. 2; and, FIG. 7 is a plan view of the transfer system shown in FIG. 1.
Figure 7:
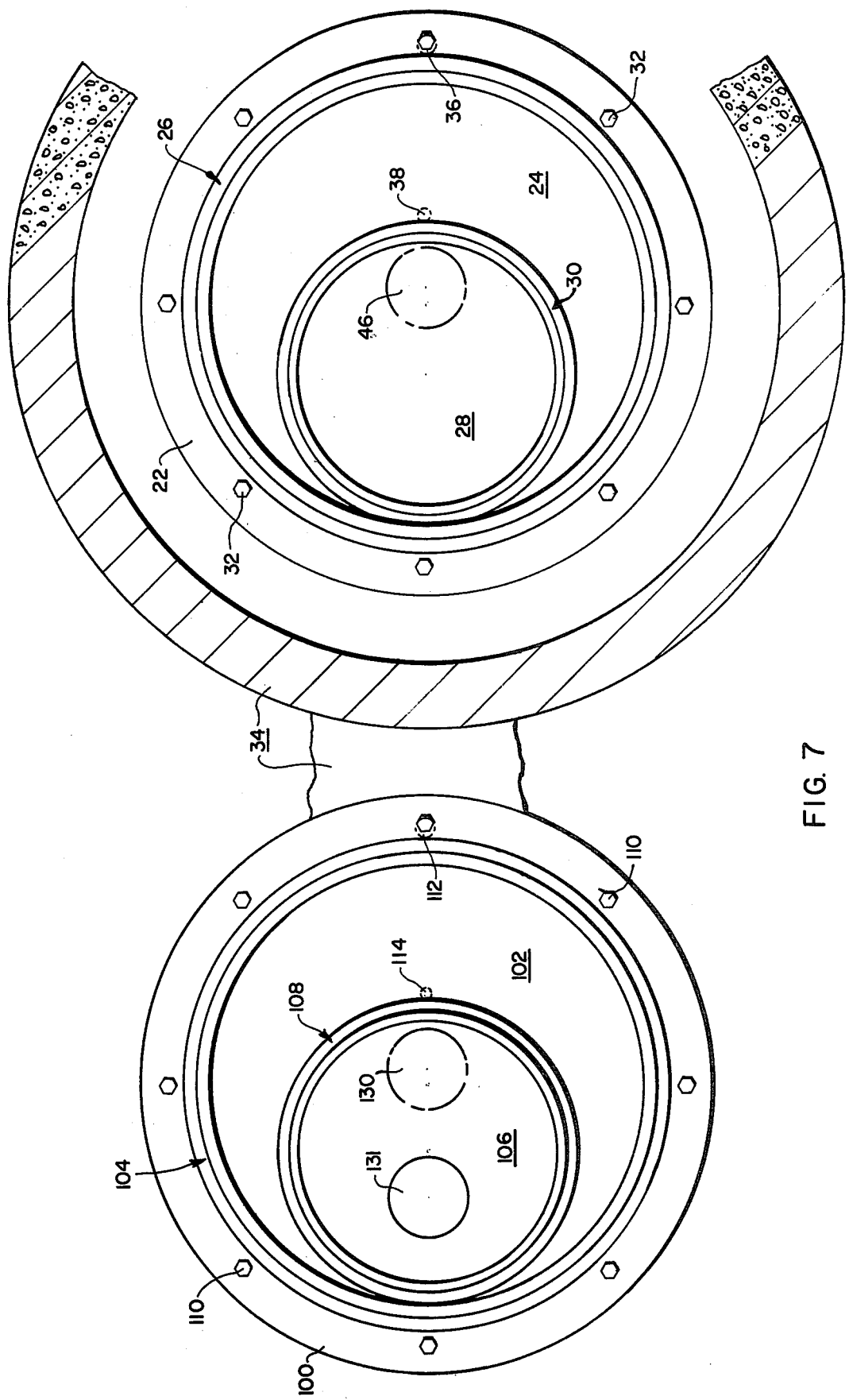

Referring now to FIGS. 2-4, with the pivotable apparatus 58 in a vertical attitude, the large rotatable plug 24, small rotatable plug 28, and in-vessel transfer machine 40 are all rotated by appropriate drive mechanism to accurately locate bore 62 in colinear alignment with a chosen fuel assembly 12 immediately below it. At this point, the linkage actuator raises third link 78 which causes roller guide link to be raised along a vertical line defined by guide tube 76. In turn second linkage 70 is raised pivoting first linkage 64 about dual pin arrangement 68 until stop 66 contacts pivotable apparatus 58 causing pivotable apparatus 58 to contact lip 51 as illustrated in FIG. 3. In this position, the bore of grapple housing 50 is in colinear alignment with bore 62 and with the chosen fuel assembly of the core 10. However, in this position, socket 67 of first link 64 has been pivoted out from under pivotable apparatus 58 thereby allowing free access to bore 62. The grapple actuating mechanism then causes grapple chain 53 to descend which in turn lowers grapple 52 to the top of the chosen fuel assembly in the core 10. Grapple 52 then engages the fuel assembly 12 and under the action of the grapple actuating mechanism lifts the fuel assembly 12 completely into bore 62 and clear of first link 64. With fuel assembly 12 completely in bore 62, first link 64 is moved back to its original position, so that socket 67 is immediately under bore 62 and aligned therewith. The fuel assembly 12 is then lowered so that it rests in socket 67. Grapple 52 is then raised completely into grapple housing 50 clear of pivotable apparatus 58. At this point lower frame 54 is then rotated so that pivotable apparatus 58 clears lip 51 and rests in a vertical plane defined by exit side tube 132.

Referring now to FIG. 4, once again third link 78 is raised which causes socket 67 to contact the fuel assembly in it. In turn the fuel assembly contacts bore 62 which causes pivotable apparatus 58 to pivot about pin arrangement 60. The fuel assembly in bore 62 and socket 67 is thus used to mechanically connect first link 64 to pivotable apparatus 58 thus enabling pivotable apparatus to pivot in a vertical plane.

Referring once again to FIG. 1, the pivotable apparatus 58 comes to rest on ledge 140 of reactor vessel 14 thereby relieving the fuel assembly of its contact with socket 67 and bore 62. Ledge 140 also enables pivotable apparatus 58 to align with exit side tube 132. Meanwhile, fuel assembly carriage 120 is pivoted about assembly 126 by activating grapple control mechanism 128 so as to draw grapple mechanism 122 against a stop 121 in fuel assembly carriage 120 thereby pivoting fuel assembly carriage 120 slightly above the angle of exit side tube 132 but not aligned therewith. Then first rotatable plug 102 and, second rotatable plug 106 together with ex-vessel transfer machine 116 are rotated so that fuel assembly carriage 120 is brought into alignment with the vertical plane of exit side tube 132. When fuel assembly carriage 120 is in alignment with exit side tube 132 and above storage ledge 142, grapple control mechanism 128 lowers grapple mechanism 122 which allows fuel assembly carriage 120 to pivot about pivoting assembly 126 under the force of gravity so as to come to rest on storage ledge 142.

The grapple control mechanism 128 then lowers grapple mechanism 122 through exit side tube 132 into pivotable apparatus 58 where grapple mechanism 122 engages the fuel assembly 12 in pivotable apparatus 58. The grapple control mechanism 128 then lifts both grapple mechanism 122 and the fuel assembly 12 into fuel assembly carriage 120. With fuel assembly 12 completely within fuel assembly carriage 120 and with grapple mechanism 122 against stop 123, in-vessel transfer machine 116 is rotated clear of storage ledge 142 and over the appropriate storage rack 92. By allowing grapple control mechanism 128 to release grapple mechanism 122 from stop 123 the fuel assembly carriage 120 is pivoted about pivoting assembly 126 into position 144 which is in alignment with the appropriate storage rack 92. Once in this position, grapple control mechanism 128 then further lowers grapple mechanism 122 and fuel assembly 12 into storage rack 92 where grapple mechanism 122 disengages the fuel assembly 12. Of course, this process may be used in reverse manner to enable a fresh fuel assembly to be introduced into core 10. Another fuel transfer machine which may be chosen from those well known in the art may be used in conjunction with exit port 131 to remove or introduce fuel assemblies to the storage racks 92. This system provides a means of transferring a fuel assembly 12 between the core 10 and storage racks 92 while the fuel assembly remains completely submerged in a continuous body of coolant 20. The fuel assembly being constantly under a continuous body of coolant is always in a good position for convective cooling, eliminating the need for auxiliary cooling systems for the fuel assembly in transit. Further, the fuel never comes above the operating floor of the reactor, thereby eliminating the possibility of sodium spills during reactor refueling.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, the pivotable apparatus and fuel assembly carriage may be adapted to accommodate a multiplicity of fuel assemblies at once thereby reducing refueling time. In addition, the in-vessel transfer machine may be used in the storage vessel while the ex-vessel transfer machine replaces the in-vessel transfer machine in the reactor vessel.

I claim:

1. A nuclear fuel transfer system including a reactor vessel, fuel assemblies positioned in a first array therein, an inlet and an outlet for circulating a coolant in a heat transfer relationship with said fuel assemblies, a first closure head disposed on said reactor vessel in a fluid tight relationship, and a storage vessel positioned adjacent to said reactor vessel having an inlet and outlet for circulating a coolant therethrough, fuel assemblies positioned in a second array therein, and a second closure head disposed on said storage vessel, said fuel transfer system comprising:

connecting means disposed between said reactor vessel and said storage vessel for allowing the transfer of said fuel assemblies between said reactor vessel and said storage vessel while said fuel assemblies remain completely submerged in a continuous body of coolant being a single body of coolant occupying and capable of flowing among said reactor vessel, said storage vessel, and said connecting means for cooling said fuel assemblies;

first fuel assembly transfer means disposed on said first closure head and extending into said reactor vessel for transferring said fuel assemblies between said first array and said storage vessel, said first fuel assembly transfer means including a first pivotable apparatus for holding said fuel assemblies and for aligning said fuel assemblies in a position for transfer through said connecting means; and second fuel assembly transfer means disposed on said second closure head for transferring said fuel assemblies between said second array and said reactor vessel, said first fuel assembly transfer means cooperating with said second fuel assembly transfer means for transferring said fuel assemblies through said connecting means.

2. The system recited in claim 1, wherein said first fuel assembly transfer means comprises:

a first frame disposed on said first closure head capable of rotation relative to said first closure head for appropriately and selectively positioning itself over selected fuel assemblies in said first array;

a first pivotable apparatus attached to said first frame for holding said fuel assemblies and capable of pivoting with respect to said first frame for aligning said pivotable apparatus with said first array and said connecting means; and a grapple associated with said first pivotable apparatus for transferring said fuel assemblies between said first array and said first pivotable apparatus while said fuel assemblies remain completely submerged in a continuous body of coolant.

3. The system recited in claim 2 wherein said first fuel assembly transfer means further comprises:

a second frame cooperating with said first frame and capable of independent rotation for positioning itself in relation to said first pivotable apparatus.

4. The system recited in claim 3 wherein said second fuel assembly transfer means comprises:

a third frame disposed on said second closure head capable of rotation relative to said second closure head for appropriately and selectively positioning itself in relation to said second array;

a second pivotable apparatus attached to said third frame capable of pivoting with respect to said third frame thereby aligning itself with said second array and said connecting means for carrying said fuel assemblies; and a second grapple associated with said second pivotable apparatus for transferring, together with said second pivotable apparatus, said fuel assemblies between said first pivotable apparatus and said second array while said fuel assemblies remain completely submerged in a continuous body of coolant.

5. The system recited in claim 4 wherein said second frame has a lip thereon for restraining said first pivotable apparatus.

6. The system recited in claim 2 wherein said first fuel assembly transfer means further comprises:

a first link attached to said first pivotable apparatus and capable of pivoting with respect thereto for causing the pivoting motion of said first pivotable apparatus.

7. The system recited in claim 6 wherein said first link comprises:

a member attached to said first pivotable apparatus, said member having a socket therein for holding said fuel assemblies during transfer and having a mechanical stop thereon for allowing said member to pivot with respect to said first pivotable apparatus, said fuel assemblies extending through said first pivotable apparatus into said socket thereby providing a rigid linkage between said first pivotable apparatus and said first link whereby the pivoting action of said first link causes the pivoting action of said first pivotable apparatus.

8. The system recited in claim 7 wherein said first fuel assembly transfer means further comprises:

a second link attached to said first link; and a linkage actuator attached to said second link for actuating said second link, said second link actuating said first link causing said pivoting action of said first link.

9. The system recited in claim 8 wherein said second link comprises:

an elongated member attached to said first link; and a roller guide disposed within a guide tube and attached to said elongated member and to said linkage actuator for establishing a vertical motion of said elongated member under the action of said linkage actuator.

* * * * *